(12) United States Patent
Peng

(10) Patent No.: US 12,539,988 B2
(45) Date of Patent: Feb. 3, 2026

(54) AUTOMATIC MEAL DISPENSER AND MEAL DISPENSER MECHANISM THEREOF

(71) Applicant: PENG FA DESIGN INTERNATIONAL CO. LTD., Hsinchu County (TW)

(72) Inventor: Yen-Chun Peng, Hsinchu County (TW)

(73) Assignee: PENG FA DESIGN INTERNATIONAL CO. LTD., Hsinchu County (TW)

(*) Notice: Subject to any disclaimer, the term of this patent is extended or adjusted under 35 U.S.C. 154(b) by 0 days.

(21) Appl. No.: 18/956,381

(22) Filed: Nov. 22, 2024

(65) Prior Publication Data

US 2026/0001669 A1 Jan. 1, 2026

(30) Foreign Application Priority Data

Jun. 27, 2024 (TW) ................................ 113123916

(51) Int. Cl.
| | |
|---|---|
| B65B 1/38 | (2006.01) |
| B65B 1/10 | (2006.01) |
| B65B 1/32 | (2006.01) |
| B65B 37/06 | (2006.01) |
| B65B 37/08 | (2006.01) |
| B65B 37/18 | (2006.01) |

(52) U.S. Cl.
CPC ............... B65B 1/38 (2013.01); B65B 1/10 (2013.01); B65B 1/32 (2013.01); B65B 37/06 (2013.01); B65B 37/08 (2013.01); B65B 37/18 (2013.01)

(58) Field of Classification Search
CPC .... B65B 1/04; B65B 1/10; B65B 1/32; B65B 1/38; B65B 37/06; B65B 37/08; B65B 37/18
See application file for complete search history.

(56) References Cited

U.S. PATENT DOCUMENTS

| | | | | |
|---|---|---|---|---|
| 1,891,830 A | * | 12/1932 | Nicholson ............. | B65B 25/061 141/81 |
| 2,406,819 A | * | 9/1946 | Farrall ................... | A23C 15/02 426/520 |
| 2,634,691 A | * | 4/1953 | Flockhart .................. | B65B 1/38 425/308 |

(Continued)

*Primary Examiner* — Nicolas A Arnett
(74) *Attorney, Agent, or Firm* — Li & Cai Intellectual Property (USA) Office

(57) ABSTRACT

An automatic meal dispenser and a meal dispenser mechanism thereof are provided. The meal dispenser mechanism includes a dispensing module and a mixing unit that includes a body. The body has a first opening and a second opening. The dispensing module includes a shell, a dispensing component, and a first drive assembly. The shell has an inlet opening and an outlet channel. The dispensing component includes an accommodating ring. The first drive assembly is movable along a predetermined direction, and is configured to drive the dispensing component to move between a first position and a second position relative to the shell. When the dispensing component is located at the first position, the accommodating ring corresponds in position to the inlet opening and the second opening. When the dispensing component is located at the second position, the accommodating ring corresponds in position to the outlet channel.

10 Claims, 10 Drawing Sheets

(56) References Cited

U.S. PATENT DOCUMENTS

| | | | | |
|---|---|---|---|---|
| 3,763,765 A * | 10/1973 | Nelson | ................ | A21C 15/007 |
| | | | | 269/254 R |
| 4,189,071 A * | 2/1980 | West | ...................... | G01F 11/22 |
| | | | | 222/189.11 |
| 4,993,593 A * | 2/1991 | Fabiano | ............... | B67D 3/0022 |
| | | | | 366/147 |
| 5,102,015 A * | 4/1992 | Barnard | ............... | B67D 3/0019 |
| | | | | 222/144.5 |
| 10,154,762 B2 * | 12/2018 | Farid | ...................... | A47J 44/00 |
| 11,920,799 B2 * | 3/2024 | Xu | ...................... | H05B 6/1227 |
| 2016/0235239 A1 * | 8/2016 | Patadia | .................. | A47J 27/09 |

* cited by examiner

AUTOMATIC MEAL DISPENSER AND MEAL DISPENSER MECHANISM THEREOF

CROSS-REFERENCE TO RELATED PATENT APPLICATION

This application claims the benefit of priority to Taiwan Patent Application No. 113123916, filed on Jun. 27, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a meal dispenser mechanism, and more particularly to an automatic meal dispenser and a meal dispenser mechanism thereof.

BACKGROUND OF THE DISCLOSURE

Conventionally, rationing in each of a plurality of lunch boxes is manually performed, so that meals are allocated to a plurality of containers (i.e., producing the lunch boxes). However, such manual operation is time-consuming and can result in low production efficiency of the lunch boxes. In addition, if a portion size of the meal that is allocated to one container is determined with the naked eye, there is great difficulty in maintaining the consistency of the lunch boxes.

SUMMARY OF THE DISCLOSURE

In response to the above-referenced technical inadequacies, the present disclosure provides an automatic meal dispenser and a meal dispenser mechanism thereof for effectively improving existing issues associated with manual rationing of meals.

In order to solve the above-mentioned problems, one of the technical aspects adopted by the present disclosure is to provide an automatic meal dispenser. The automatic meal dispenser includes a meal dispenser mechanism, a feeding mechanism, and a delivery mechanism. The meal dispenser mechanism includes a mixing unit and a dispensing module arranged at one side of the mixing unit. The mixing unit includes a body and a stirring component disposed on the body. The body has a first opening and a second opening away from the first opening. The stirring component includes a rotating shaft and a fan blade pivotally connected to the rotating shaft, the fan blade is rotatable about the rotating shaft, and the fan blade passes by an inner side of the body that is adjacent to the second opening when rotating. The dispensing module includes a shell fixedly disposed at one side of the body, a dispensing component arranged in the shell, and a first drive assembly that is disposed at one of a plurality of sides of the shell and connected to the dispensing component. The shell has an inlet opening and an outlet channel away from the inlet opening, and the inlet opening corresponds in position to the second opening. The dispensing component is movable relative to an inner edge of the shell, and the dispensing component includes an accommodating ring. The accommodating ring corresponds in size to the second opening. The first drive assembly is movable along a predetermined direction, and the first drive assembly is configured to drive the dispensing component to move between the first position and the second position relative to the shell. When the dispensing component is located at the first position, the accommodating ring corresponds in position to the inlet opening and the second opening. When the dispensing component is located at the second position, the accommodating ring corresponds in position to the outlet channel. The feeding mechanism is disposed on the first opening of the body. The delivery mechanism is arranged at another one of the sides of the shell, and the delivery mechanism is configured to deliver a plurality of containers, so that the containers sequentially move to a position corresponding to the accommodating ring of the dispensing component that is located at the second position.

In order to solve the above-mentioned problems, another one of the technical aspects adopted by the present disclosure is to provide a meal dispenser mechanism. The meal dispenser mechanism includes a mixing unit and a dispensing module arranged at one side of the mixing unit. The mixing unit includes a body and a stirring component disposed on the body. The body has a first opening and a second opening away from the first opening. The stirring component includes a rotating shaft and a fan blade pivotally connected to the rotating shaft, the fan blade is rotatable about the rotating shaft, and the fan blade passes by an inner side of the body that is adjacent to the second opening when rotating. The dispensing module includes a shell fixedly disposed at one side of the body, a dispensing component arranged in the shell, and a first drive assembly that is disposed at one side of the shell and connected to the dispensing component. The shell has an inlet opening and an outlet channel away from the inlet opening, and the inlet opening corresponds in position to the second opening. The dispensing component is movable relative to an inner edge of the shell, and the dispensing component includes an accommodating ring. The accommodating ring corresponds in size to the second opening. The first drive assembly is movable along a predetermined direction, and the first drive assembly is configured to drive the dispensing component to move between the first position and the second position relative to the shell. When the dispensing component is located at the first position, the accommodating ring corresponds in position to the inlet opening and the second opening. When the dispensing component is located at the second position, the accommodating ring corresponds in position to the outlet channel.

Therefore, in the automatic meal dispenser and the meal dispenser mechanism thereof provided by the present disclosure, by virtue of "the fan blade being rotatable about the rotating shaft, and the fan blade passing by an inner side of the body that is adjacent to the second opening when rotating," "the first drive assembly being configured to drive the dispensing component to move between a first position and a second position relative to the shell," "the accommodating ring corresponding in position to the inlet opening and the second opening when the dispensing component is located at the first position," and "the accommodating ring corresponding in position to the outlet channel when the dispensing component is located at the second position," the automatic meal dispenser and the meal dispenser mechanism thereof can precisely control a portion size of the meal, so as to allocate the meal to each of the containers. In this way, the production efficiency of lunch boxes can be improved, and the consistency of the lunch boxes can be achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
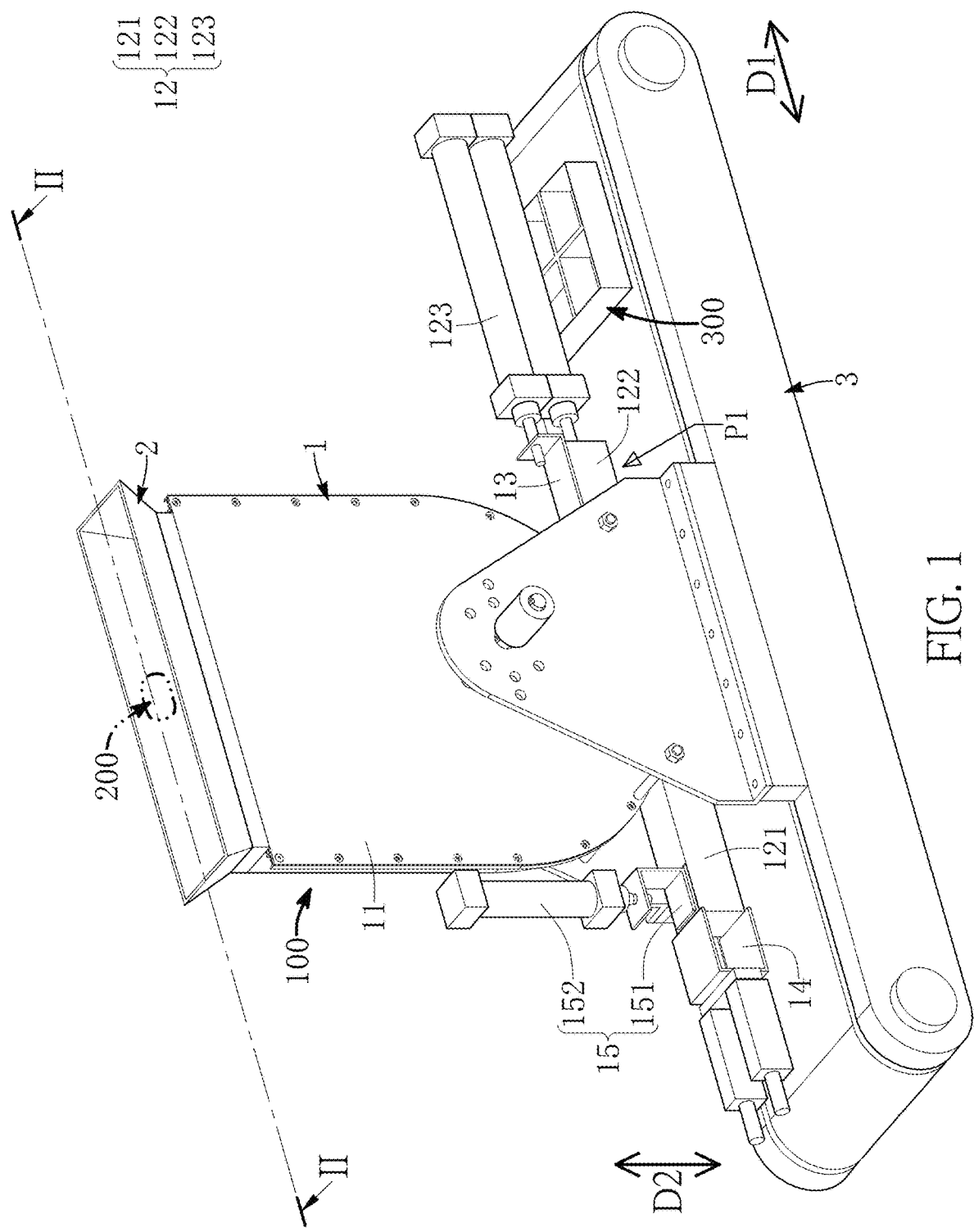
FIG. 1 is a schematic perspective view of an automatic meal dispenser and a meal dispenser mechanism thereof according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 10, a first embodiment of the present disclosure provides an automatic meal dispenser 100. As shown in FIG. 1, the automatic meal dispenser 100 includes a meal dispenser mechanism 1, a feeding mechanism 2 disposed on one side of the meal dispenser mechanism 1, and a delivery mechanism 3 arranged at another side of the meal dispenser mechanism 1.

It should be noted that, in the present embodiment, the meal dispenser mechanism 1, the feeding mechanism 2, and the delivery mechanism 3 are jointly defined as the automatic meal dispenser 100, but the present disclosure is not limited thereto. For example, the meal dispenser mechanism 1 can be independently used (e.g., implemented, manufactured, or sold) or can be used in cooperation with other components. Furthermore, in other embodiments of the present disclosure not shown in the drawings, a quantity of the meal dispenser mechanism 1, a quantity of the feeding mechanism 2, and a quantity of the delivery mechanism 3 can be added according to design requirements and are not limited by the present embodiment.

Specifically, the automatic meal dispenser 100 of the present embodiment can precisely control a portion size of a meal 200 through the meal dispenser mechanism 1. In order to better understand the present embodiment, the following description describes components and structures of the meal dispenser mechanism 1 and connection relationships thereof.

Figure 2:
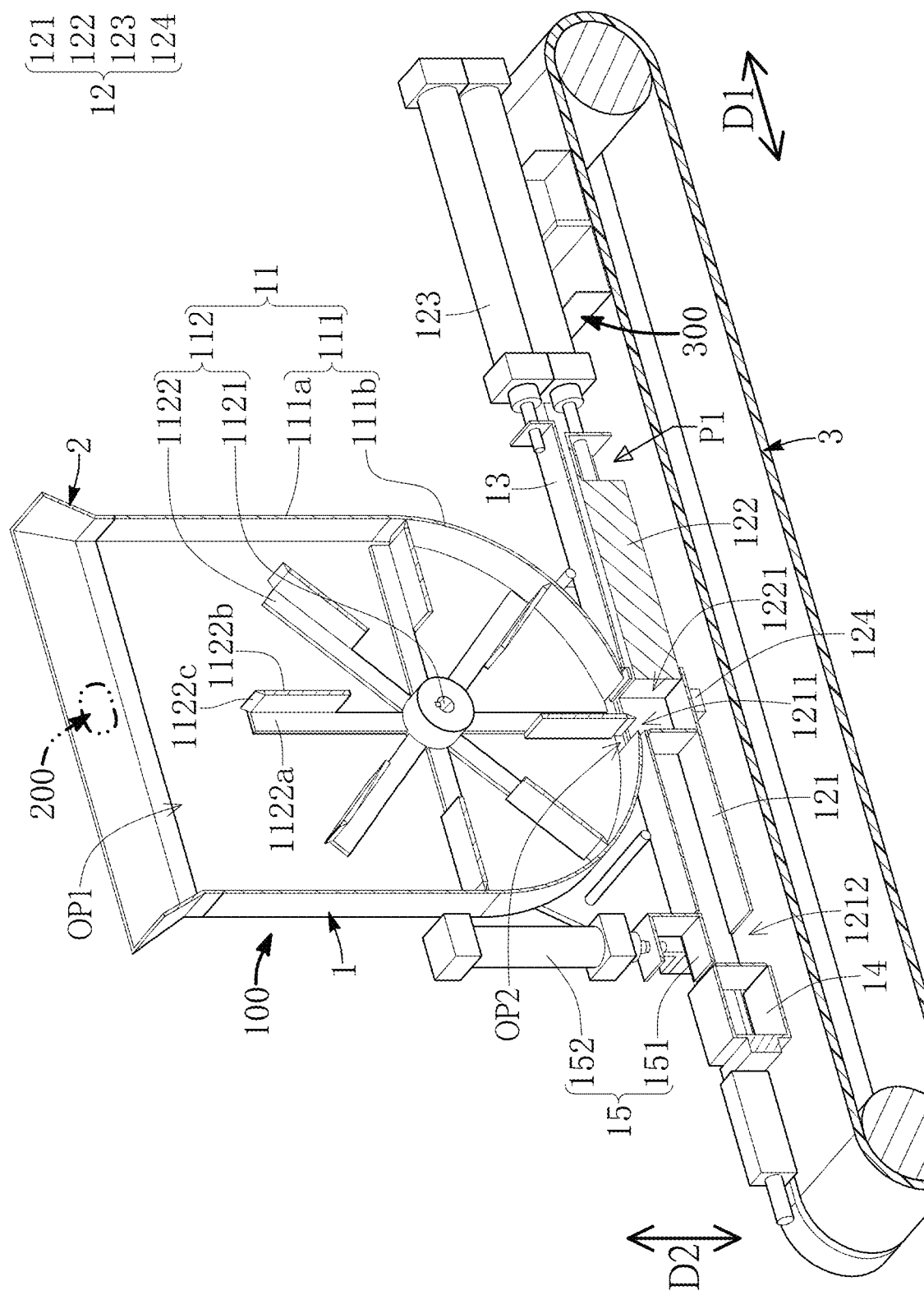
FIG. 2 is a schematic cross-sectional view taken along line II-II of FIG. 1.

As shown in FIG. 2, the meal dispenser mechanism 1 includes a mixing unit 11, a dispensing module 12 arranged at one side (e.g., a lower side) of the mixing unit 11, a cutting module 13 connected to the dispensing module 12, a baffle module 14 arranged at one of a plurality of sides (e.g., a left side) of the dispensing module 12, and a pushing module 15 arranged at other one of the sides (e.g., an upper side) of the dispensing module 12, but the present disclosure is not limited thereto.

For example, in other embodiments of the present disclosure not shown in the drawings, the meal dispenser mechanism 1 can selectively omit the cutting module 13, the baffle module 14, or the pushing module 15, and cooperate with the mixing unit 11 and the dispensing module 12.

Figure 3:
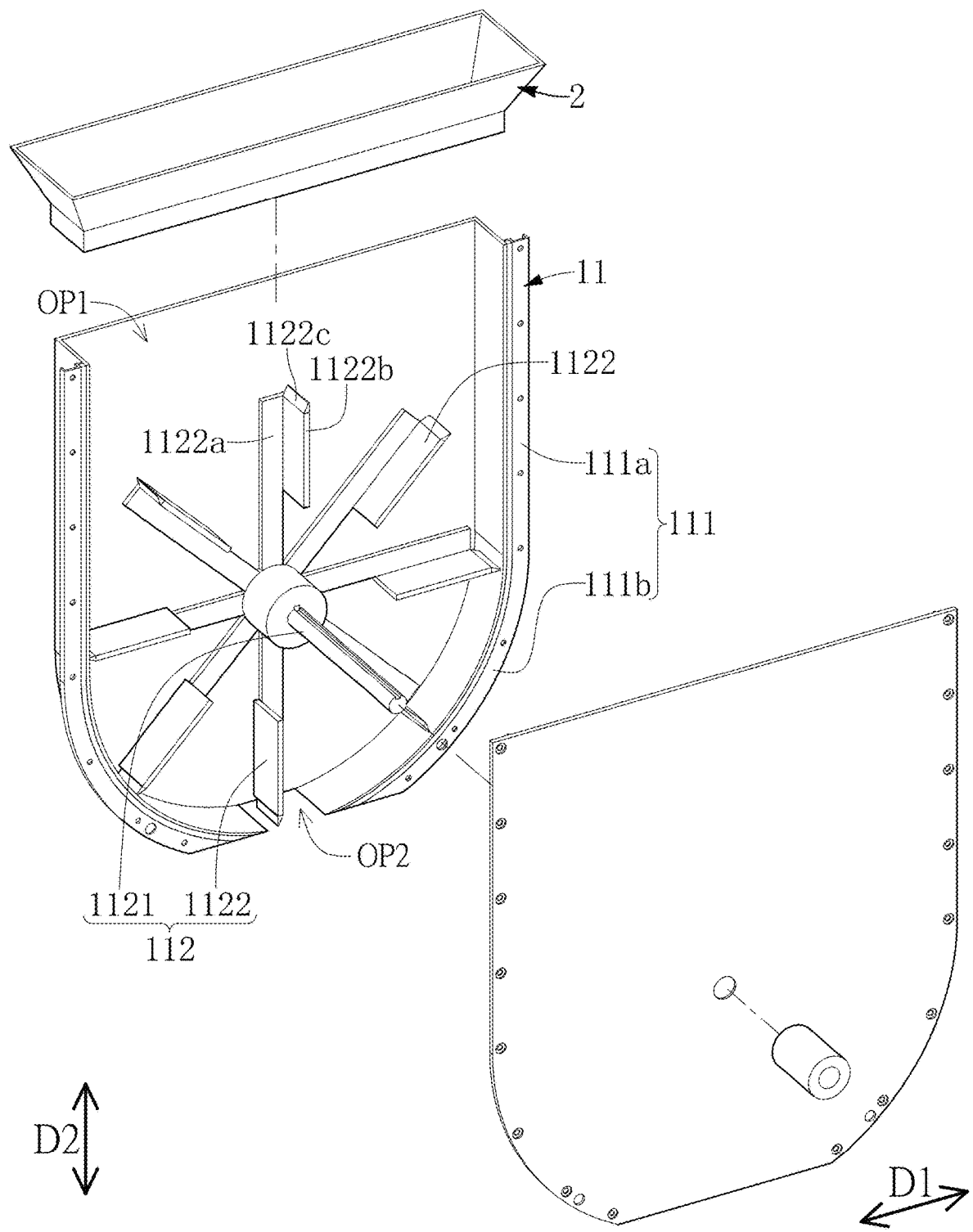
FIG. 3 is a schematic exploded view of a mixing unit according to the first embodiment of the present disclosure.

As shown in FIG. 2 and FIG. 3, the mixing unit 11 includes a body 111 and a stirring component 112 disposed on the body 111.

Specifically, the body 111 has a first opening OP1 and a second opening OP2 away from the first opening OP1, and a size of the first opening OP1 is greater than or equal to a size of the second opening OP2.

Accordingly, the body 111 substantially has a funnel shape, and the body 111 includes a reducing portion 111b and an extension portion 111a connected to the reducing portion 111b. Furthermore, the extension portion 111a has the first opening OP1, and the reducing portion 111b has the second opening OP2.

The stirring component 112 includes a rotating shaft 1121 and a fan blade 1122 pivotally connected to the rotating shaft 1121, and the fan blade 1122 can rotate about the rotating shaft 1121. In the present embodiment, the fan blade 1122 includes a plurality of blades 1122a, a plurality of stirring blades 1122b, and a plurality of flexible blades 1122c. Specifically, each of the stirring blades 1122b is disposed on one end of each of the blades 1122a, and each of the flexible blades 1122c is disposed on one end of each of the stirring blades 1122b. However, a quantity of the blades 1122a, a quantity of the stirring blades 1122b, and a quantity of the flexible blades 1122c can be adjusted or changed according to design requirements, and the present disclosure is not limited thereto. For example, in other embodiments of the present disclosure not shown in the drawings, the fan blade 1122 can include one blade 1122a, one stirring blade 1122b, and one flexible blade 1122c. Naturally, the fan blade 1122 can include more than one blade 1122a, more than one stirring blade 1122b, and one flexible blade 1122c that is correspondingly disposed on one of the stirring blades 1122b.

Specifically, a length of each of the stirring blades 1122b is less than or equal to a half of a length of each of the blades 1122a, but the present embodiment is not limited thereto. For example, the length of each of the stirring blades 1122b can be equal to the length of each of the blades 1122a. In detail, the fan blade 1122 passes by an inner side of the second opening OP2 of the reducing portion 111b when rotating, and a side edge of each of the flexible blades 1122c can contact an inner edge of the reducing portion 111b of the body 111, thereby preventing the meal 200 accommodated in the body 111 from remaining on the inner edge of the reducing portion 111b. Accordingly, the mixing unit 1 can receive the meal 200 through the first opening OP1 and stir the meal 200. Then, through the second opening OP2, the mixing unit 1 can fill the meal 200 into the dispensing module 12.

Figure 4:
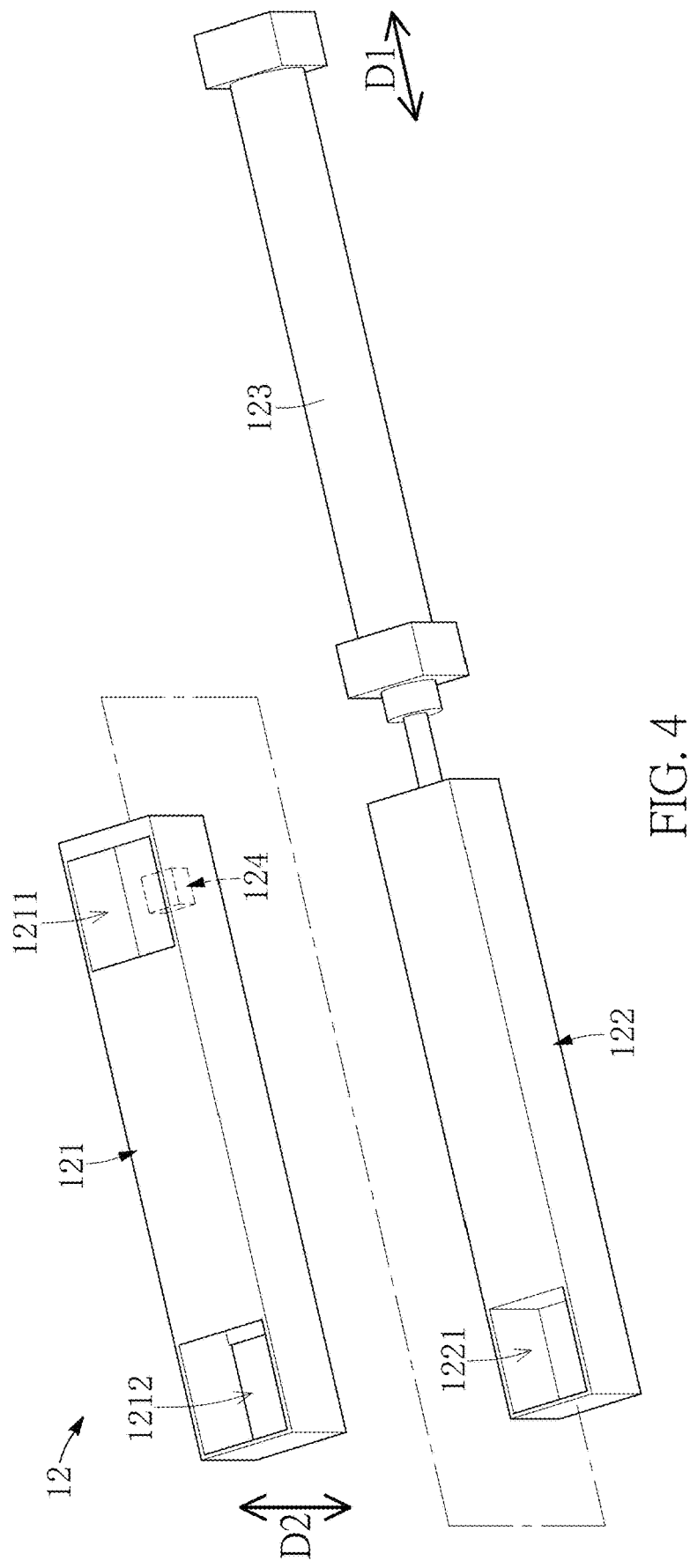
FIG. 4 is a schematic exploded view of a dispensing module according to the first embodiment of the present disclosure.

As shown in FIG. 2 and FIG. 4, in the present embodiment, the dispensing module 12 is arranged at a lower side of the mixing unit 11. The dispensing module 12 includes a shell 121, a dispensing component 122 arranged in the shell 121, and a first drive assembly 123 disposed at one side of the shell 121.

Figure 5:
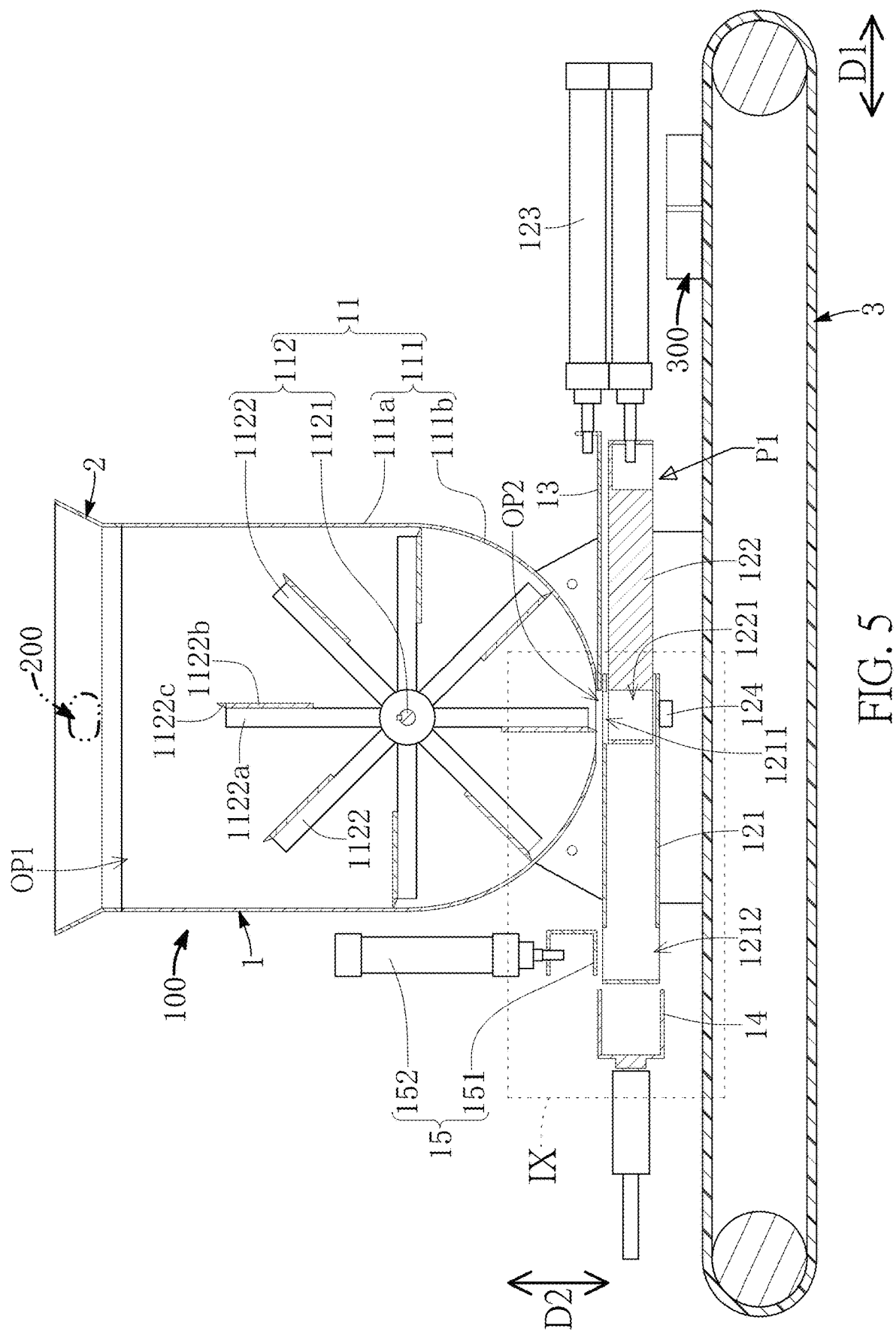
FIG. 5 is a schematic planar view of FIG. 2.
Figure 9:
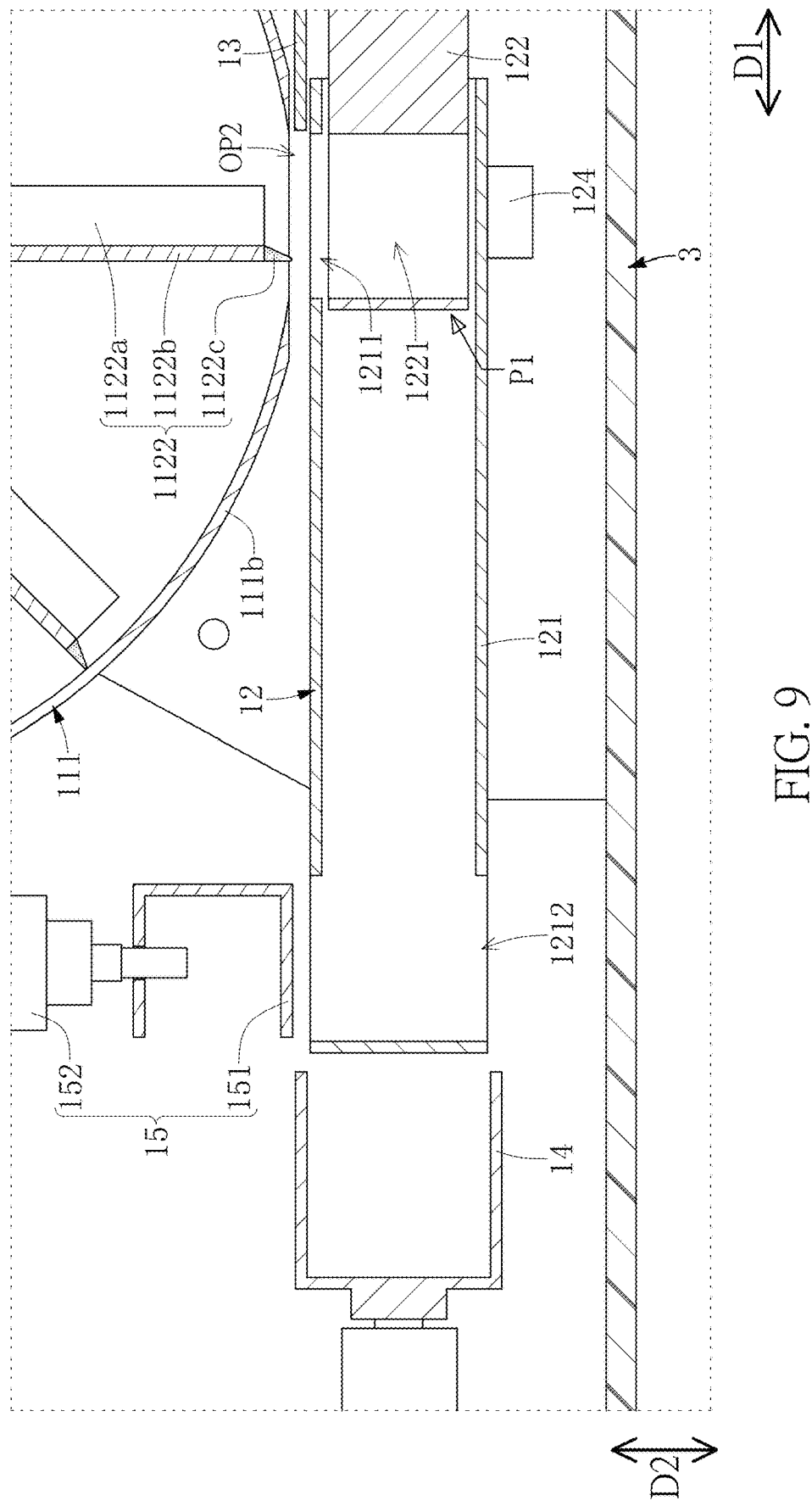
FIG. 9 is a partial enlarged view of section IX of FIG. 5.

Specifically, as shown in FIG. 5 and FIG. 9, the shell 121 is fixedly disposed at one side of the body 111 of the mixing unit 11. The shell 121 has an inlet opening 1211 and an outlet channel 1212 away from the inlet opening 1211, and the inlet opening 1211 corresponds in position to the second opening OP2 of the body 111.

Moreover, the dispensing component 122 is arranged in the shell 121, and the dispensing component 122 is movable relative to an inner edge of the shell 121. The dispensing component 122 includes an accommodating ring 1221, and the accommodating ring 1221 corresponds in size to the second opening OP2.

As shown in FIG. 5 to FIG. 8, the first drive assembly 123 is connected to the dispensing component 122, and is movable along a predetermined direction D1. It should be noted that, through the first drive assembly 123, the dispensing component 122 can move relative to the inner edge of the shell 121. In addition, the dispensing component 122 can be driven by the first drive assembly 123 to move between a first position P1 and a second position P2 relative to the shell 121.

Figure 6:
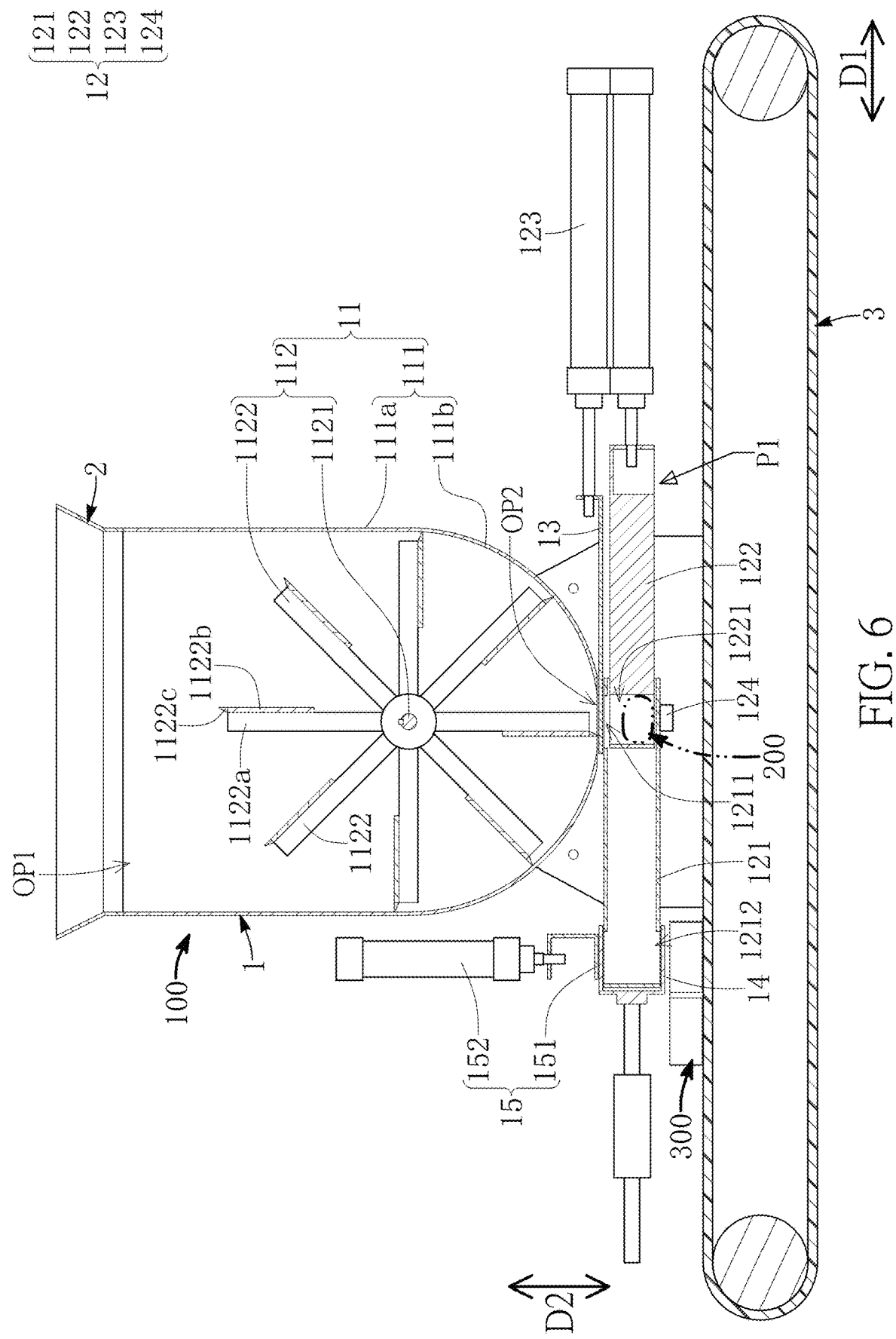
FIG. 6 is a schematic planar view showing another variation of FIG. 5.

Specifically, as shown in FIG. 5 and FIG. 6, through cooperation of the shell 121, the dispensing component 122, and the first drive assembly 123, the accommodating ring 1221 corresponds in position to the inlet opening 1211 of the shell 121 when the dispensing component 122 is located at the first position P1 relative to the shell 121. More specifically, the inlet opening 1211 of the shell 121 can receive the meal 200 leaving from the second opening OP2, and the accommodating ring 1221 of the dispensing component 122 can accommodate the meal 200.

Figure 7:
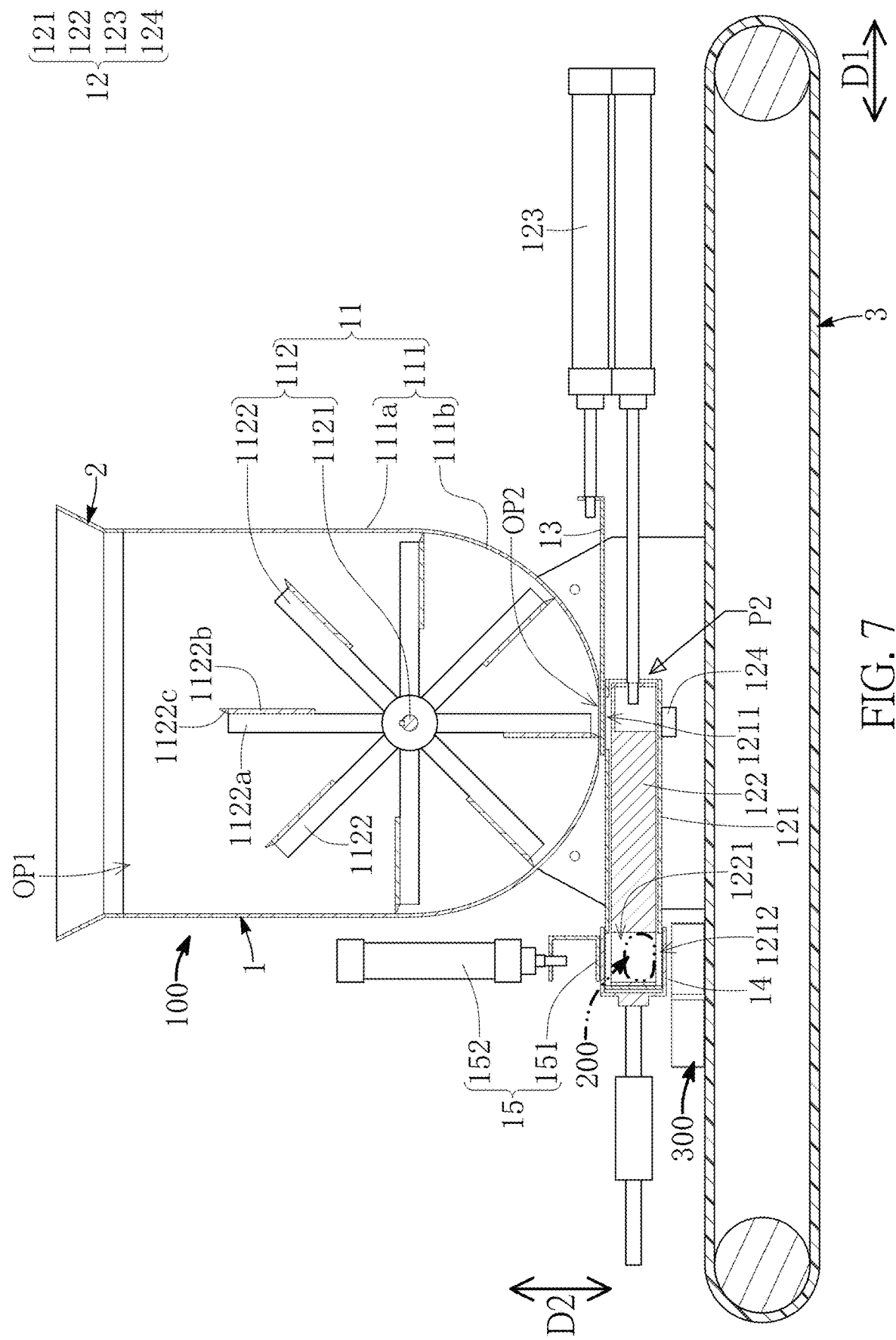
FIG. 7 is a schematic planar view showing yet another variation of FIG. 5.
Figure 8:
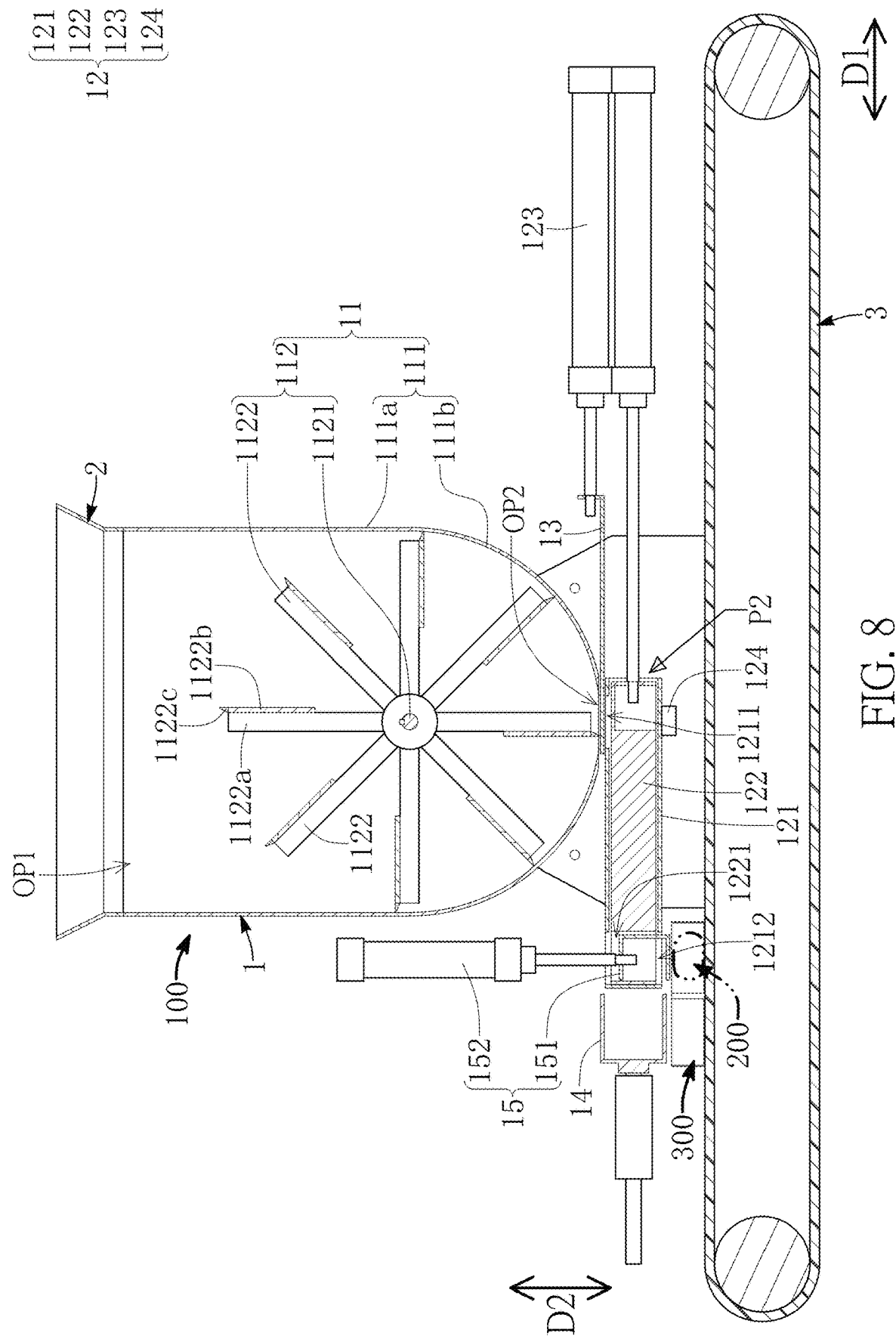
FIG. 8 is a schematic planar view showing still another variation of FIG. 5.

Moreover, as shown in FIG. 7 and FIG. 8, when the dispensing component 122 is located at the second position P2 relative to the shell 121, the accommodating ring 1221 corresponds in position to the outlet channel 1212 of the shell 121. Specifically, the outlet channel 1212 is configured to enable the meal 200 that is accommodated in the accommodating ring 1221 to exit the dispensing module 12.

Figure 10:
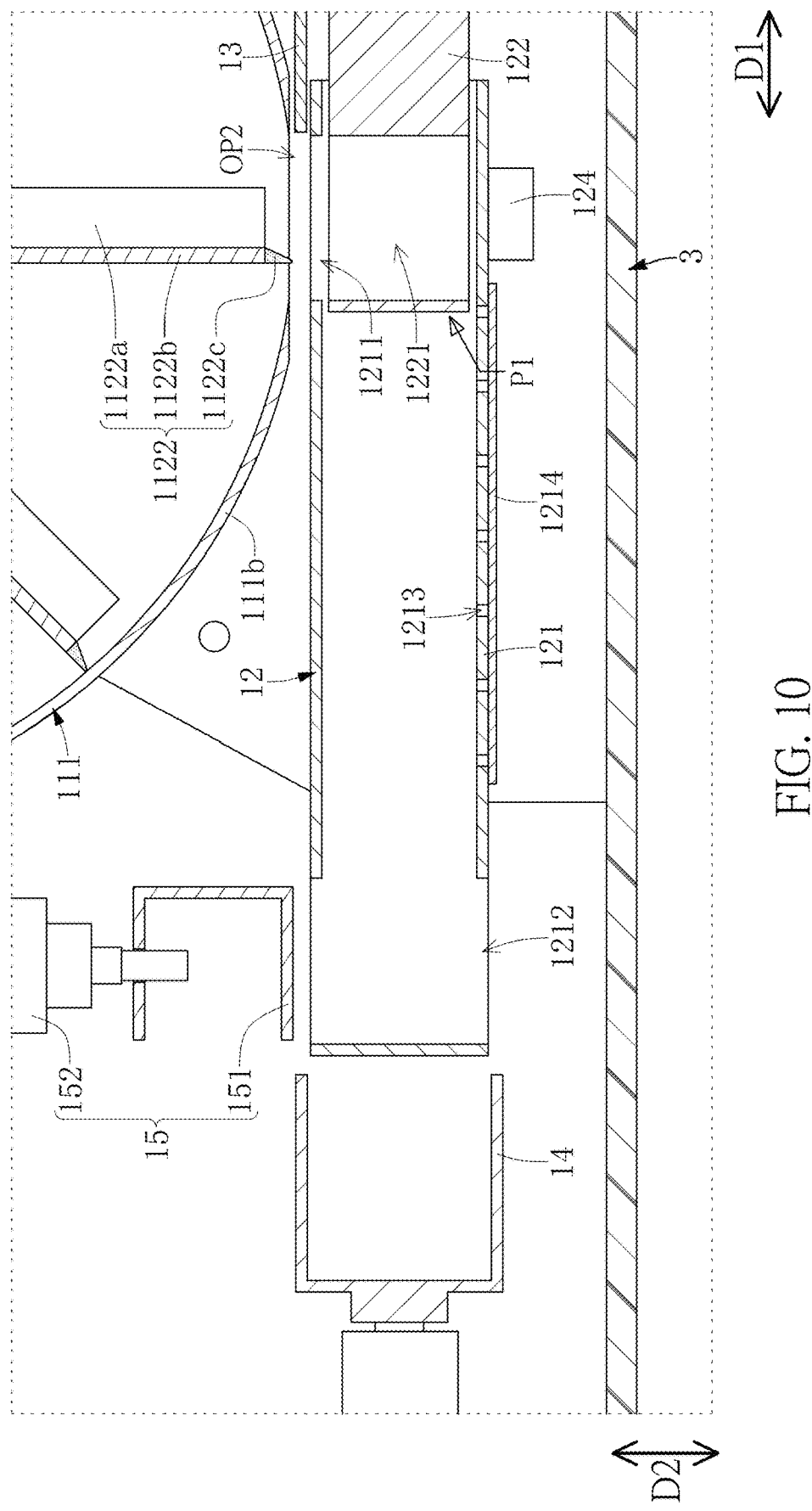
FIG. 10 is a partial enlarged view showing another variation of FIG. 9.

It is worth mentioning that, as shown in FIG. 10, the shell 121 of the present embodiment further has a plurality of holes 1213 and a covering board 1214, and the holes 1213 are detachably covered by the covering board 1214. The holes 1213 and the covering board 1214 are arranged between the inlet opening 1211 and the outlet channel 1212 and away from the second opening OP2. Furthermore, the holes 1213 are in spatial communication with the accommodating ring 1221 of the dispensing component 122.

Specifically, when the dispensing component 122 delivers the meal 200 and moves relative to the inner edge of the shell 121 (i.e., moving from the first position P1 to the second position P2), the covering board 1214 can selectively open or close the holes 1213.

For example, when the meal 200 is leafy vegetables, the covering board 1214 can open the holes 1213, so that juices of the leafy vegetables can be drained out from the holes 1213. Conversely, when the meal 200 is curry, the covering board 1214 can close the holes 1213 to prevent the curry from flowing out of the holes 1213. In practice, the holes 1213 and the covering board 1214 can be selectively added according to design requirements, and the present disclosure is not limited thereto.

It should be noted that, as shown in FIG. 6 and FIG. 7, the dispensing module 12 further includes a weight sensor 124 to accurately determine a time point at which the first drive assembly 123 drives the dispensing component 122, but the present disclosure is not limited thereto. For example, in other embodiments of the present disclosure not shown in the drawings, the dispensing module 12 can include an optocoupler, a photoelectric sensor, or a capacitive sensor to determine the time point at which the first drive assembly 123 drives the dispensing component 122.

The weight sensor 124 is disposed on one side of the shell 121 away from the second opening OP2 of the body 111, and the weight sensor 124 corresponds in position to the inlet opening 1211. When the meal 200 falls into the inlet opening 1211, the weight sensor 124 is configured to measure a weight of the meal 200 that is accommodated in the accommodating ring 1221.

Specifically, when the dispensing component 122 is located at the first position P1 relative to the shell 121, the weight sensor 124 can measure the weight of the meal 200. When the weight of the meal 200 reaches a weight value, the first drive assembly 123 drives the dispensing component 122 to move from the first position P1 to the second position P2 relative to the shell 121.

The description above describes structures of the dispensing module 12 and cooperation thereof. The dispensing module 12 can cooperate with the cutting module 13, the baffle module 14, and the pushing module 15, so that the portion size of the meal 200 can be more precise. The following description sequentially describes structures of the cutting module 13, the baffle module 14, and the pushing module 15, and their connection relationships with the dispensing module 12.

In the present embodiment, as shown in FIG. 5 and FIG. 6, the cutting module 13 is arranged between the mixing unit 11 and the dispensing module 12. The cutting module 13 is connected to the first drive assembly 123 of the dispensing module 12, and the cutting module 13 can be driven by the first drive assembly 123 to pass between the second opening OP2 and the inlet opening 1211 of the shell 121.

Specifically, the cutting module 13 is configured to cut the meal 200 located between the inlet opening 1211 and the second opening OP2, so as to prevent the meal 200 from remaining between the mixing unit 11 and the dispensing module 12.

Moreover, as shown in FIG. 5 to FIG. 8, the baffle module 14 is arranged at the left side of the dispensing module 12 along an installation direction of the dispensing module 12. Specifically, the baffle module 14 corresponds in position to the outlet channel 1212 of the shell 121.

In detail, the baffle module 14 is movable to close the outlet channel 1212 of the shell along the predetermined direction D1, and the baffle module 14 can perform a reciprocating action along the predetermined direction D1, so that the outlet channel 1212 can be opened briefly.

Accordingly, the baffle module 14 can close the outlet channel 1212 (as shown in FIG. 6 and FIG. 7) in advance, so as to prevent the meal 200 that is delivered to the outlet channel 1212 by the dispensing component 122 from splashing out of the dispensing module 12. Moreover, the baffle module 14 can open the outlet channel 1212 (as shown in FIG. 8) through the reciprocating action, so as to output the meal 200 from the outlet channel 1212.

As shown in FIG. 5 to FIG. 8, the pushing module 15 is arranged at one side (e.g., a left side) of the mixing unit 11, and is arranged at an upper side of the dispensing module 12. Specifically, the pushing module 15 corresponds in position to the outlet channel 1212 of the shell 121.

The pushing module 15 is movable along a perpendicular direction D2 that is perpendicular to the predetermined direction D1, and the pushing module 15 can pass through the outlet channel 1212 (as shown in FIG. 8). Specifically, the pushing module 15 includes a second drive assembly 152, and a pushing board 151 connected to the second drive assembly 152.

Moreover, the second drive assembly 152 is configured to drive the pushing board 151 to move along the perpendicular direction D2, so that the pushing board 151 can pass through the outlet channel 1212. When the dispensing component 122 of the dispensing module 12 is located at the second position P2 relative to the shell 121, the pushing module 15 can be driven by the second drive assembly 152 to pass through the accommodating ring 1221.

More specifically, when the dispensing component 122 delivers the meal 200 to exit the dispensing module 12, the pushing module 15 can be driven by the second drive assembly 152 to pass through the accommodating ring 1221, thereby removing the meal 200 that remains in the accommodating ring 1221.

Accordingly, the portion size of the meal 200 can be precisely controlled by the meal dispenser mechanism 1, so as to allocate the meal 200 to each of a plurality of containers 300 (i.e., producing a plurality of lunch boxes). Not only the production efficiency of the lunch boxes can be improved, but the consistency of the lunch boxes can also be achieved.

The description above describes all of the components of the meal dispenser mechanism 1 and the connection relationships thereof. The following description describes connection relationships of the meal dispenser mechanism 1, the feeding mechanism 2, and the delivery mechanism 3.

As shown in FIG. 2, the feeding mechanism 2 is connected to the mixing unit 11, and is configured to feed the meal 200 into the mixing unit 11. Specifically, the feeding mechanism 2 is connected to the first opening OP1 of the body 111.

Moreover, the delivery mechanism 3 is arranged at a lower side of the dispensing module 12, and is defined as a conveyor belt that is configured to deliver the containers 300. In detail, as shown in FIG. 5 and FIG. 6, the delivery mechanism 3 can deliver the containers 300, so that each of the containers 300 can sequentially move to a position corresponding to the outlet channel 1212 of the shell 121.

As shown in FIG. 7, after the meal 200 is processed by the meal dispenser mechanism 1, the meal 200 can be directly output to each of the containers 300 through the outlet channel 1212.

Accordingly, the automatic meal dispenser 100 provided by the present disclosure can be fully automated in allocation of the meal 200 to the containers 300 through the cooperation between the meal dispenser mechanism 1, the feeding mechanism 2, and the delivery mechanism 3, so as to replace manual operation processes and significantly reduce the costs of human resources. Hence, higher economic benefits can be obtained.

BENEFICIAL EFFECTS OF THE EMBODIMENT

In conclusion, in the automatic meal dispenser and the meal dispenser mechanism thereof provided by the present disclosure, by virtue of "the fan blade being rotatable about the rotating shaft, and the fan blade passing by an inner side of the body that is adjacent to the second opening when rotating," "the first drive assembly being configured to drive the dispensing component to move between a first position and a second position relative to the shell," "the accommodating ring corresponding in position to the inlet opening and the second opening when the dispensing component is located at the first position," and "the accommodating ring corresponding in position to the outlet channel when the dispensing component is located at the second position," the automatic meal dispenser and the meal dispenser mechanism thereof can precisely control a portion size of the meal, so as to allocate the meal to each of the containers. In this way, the production efficiency of lunch boxes can be improved, and the consistency of the lunch boxes can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic meal dispenser, comprising:
   a meal dispenser mechanism including:
      a mixing unit including:
         a body having a first opening and a second opening away from the first opening; and
         a stirring component disposed on the body, wherein the stirring component includes a rotating shaft and a fan blade pivotally connected to the rotating shaft, the fan blade is rotatable about the rotating shaft, and the fan blade passes by an inner side of the body that is adjacent to the second opening when rotating; and a dispensing module arranged at one side of the mixing unit, wherein the dispensing module includes:
- a shell fixedly disposed at one side of the body, wherein the shell has an inlet opening and an outlet channel away from the inlet opening, and the inlet opening corresponds in position to the second opening;
- a dispensing component arranged in the shell, wherein the dispensing component is movable relative to an inner edge of the shell, the dispensing component includes an accommodating ring, and the accommodating ring corresponds in size to the second opening; and
- a first drive assembly disposed at one of a plurality of sides of the shell and connected to the dispensing component, wherein the first drive assembly is movable along a predetermined direction, and the first drive assembly is configured to drive the dispensing component to move between a first position and a second position relative to the shell; wherein, when the dispensing component is located at the first position, the accommodating ring corresponds in position to the inlet opening and the second opening; wherein, when the dispensing component is located at the second position, the accommodating ring corresponds in position to the outlet channel;

a feeding mechanism disposed on the first opening of the body; and a delivery mechanism arranged at another one of the sides of the shell, wherein the delivery mechanism is configured to deliver a plurality of containers, so that the containers sequentially move to a position corresponding to the accommodating ring of the dispensing component that is located at the second position.

2. The automatic meal dispenser according to claim 1, wherein the dispensing module further includes a weight sensor, and the weight sensor is disposed on one side of the shell away from the second opening of the body.

3. The automatic meal dispenser according to claim 1, wherein the meal dispenser mechanism further includes a cutting module connected to the first drive assembly; wherein, when the dispensing component is located at the first position, the cutting module is driven by the first drive assembly to pass between the inlet opening and the second opening.

4. The automatic meal dispenser according to claim 1, wherein the meal dispenser mechanism further includes a baffle module arranged at one side of the dispensing module, and the baffle module is movable along the predetermined direction to close the outlet channel of the shell; wherein, when the dispensing component moves to the second position, the baffle module is configured to perform a reciprocating action along the predetermined direction, so that the outlet channel of the shell is briefly opened.

5. The automatic meal dispenser according to claim 1, wherein the meal dispenser mechanism further includes a pushing module arranged at one side of the dispensing module, and the pushing module is movable along a perpendicular direction that is perpendicular to the predetermined direction; wherein, when the dispensing component is located at the second position, the pushing module is configured to pass through the outlet channel of the shell and the accommodating ring.

6. The automatic meal dispenser according to claim 5, wherein the pushing module includes a second drive assembly and a pushing board connected to the second drive assembly, and the second drive assembly is configured to drive the pushing board to pass through the accommodating ring.

7. The automatic meal dispenser according to claim 1, wherein the fan blade of the stirring component includes at least one blade and at least one stirring blade disposed on the at least one blade, and a length of the at least one stirring blade is less than or equal to a half of a length of the at least one blade.

8. The automatic meal dispenser according to claim 7, wherein the body includes a reducing portion and an extension portion connected to the reducing portion, the extension portion has the first opening, the reducing portion has the second opening, and a size of the first opening is greater than or equal to a size of the second opening; wherein the fan blade further includes at least one flexible blade disposed on the at least one stirring blade, and a side edge of the at least one flexible blade is configured to contact an inner edge of the reducing portion.

9. The automatic meal dispenser according to claim 1, wherein the shell has a plurality of holes and a covering board, the holes are in spatial communication with the accommodating ring, and the holes are detachably covered by the covering board; wherein the holes and the covering board are arranged at positions away from the second opening, and the holes are selectively opened by the covering board.

10. A meal dispenser mechanism, comprising:
a mixing unit including:
- a body having a first opening and a second opening away from the first opening; and
- a stirring component disposed on the body, wherein the stirring component includes a rotating shaft and a fan blade pivotally connected to the rotating shaft, the fan blade is rotatable about the rotating shaft, and the fan blade passes by an inner side of the body that is adjacent to the second opening when rotating; and a dispensing module arranged at one side of the mixing unit, wherein the dispensing module includes:
- a shell fixedly disposed at one side of the body, wherein the shell has an inlet opening and an outlet channel away from the inlet opening, and the inlet opening corresponds in position to the second opening;
- a dispensing component arranged in the shell, wherein the dispensing component is movable relative to an inner edge of the shell, the dispensing component includes an accommodating ring, and the accommodating ring corresponds in size to the second opening; and
- a first drive assembly disposed at one side of the shell and connected to the dispensing component, wherein the first drive assembly is movable along a predetermined direction, and the first drive assembly is configured to drive the dispensing component to move between a first position and a second position relative to the shell; wherein, when the dispensing component is located at the first position, the accommodating ring corresponds in position to the inlet opening and the second opening; wherein, when the dispensing component is located at the second position, the accommodating ring corresponds in position to the outlet channel.

* * * * *